United States Patent [19]

Eckert

[11] Patent Number: 4,649,266

[45] Date of Patent: Mar. 10, 1987

[54] METHOD AND APPARATUS FOR VERIFYING POSTAGE

[75] Inventor: Alton B. Eckert, Norwalk, Conn.

[73] Assignee: Pitney Bowes Inc., Stamford, Conn.

[21] Appl. No.: 588,464

[22] Filed: Mar. 12, 1984

[51] Int. Cl.⁴ .......... G06F 15/12

[52] U.S. Cl. .......... 235/432; 235/494; 364/464

[58] Field of Search .......... 235/432, 494; 364/464

[56] References Cited

U.S. PATENT DOCUMENTS

| | | | |
|---|---|---|---|
| 3,798,360 | 3/1974 | Feistel | 178/22 |
| 3,824,375 | 7/1974 | Gross et al. | 235/61.7 B |
| 3,859,508 | 1/1975 | Brosow et al. | 235/61.7 B |
| 3,890,599 | 6/1975 | Simjian | 340/149 R |
| 3,956,615 | 5/1976 | Anderson et al. | 235/61.7 B |
| 3,978,457 | 8/1976 | Check et al. . | |
| 3,985,998 | 10/1976 | Crafton | 235/61.7 B |
| 3,990,558 | 11/1976 | Ehrat | 194/4 R |
| 4,024,380 | 5/1977 | Gunn | 235/432 |
| 4,253,158 | 2/1981 | McFiggans | 364/900 |
| 4,376,299 | 3/1983 | Rivest | 364/900 |

FOREIGN PATENT DOCUMENTS

| | | | |
|---|---|---|---|
| 1121014 | 3/1982 | Canada | 340/70 |
| 2032224 | 4/1980 | United Kingdom . | |
| 2097330 | 11/1982 | United Kingdom . | |

*Primary Examiner*—David L. Trafton
*Attorney, Agent, or Firm*—David E. Pitchenik; Melvin J. Scolnick

[57] ABSTRACT

Indicia having an encrypted number that is stamped upon a mail piece representative of postage so as to provide a code for authentication of such postage.

12 Claims, 3 Drawing Figures

METHOD AND APPARATUS FOR VERIFYING POSTAGE

BACKGROUND OF THE INVENTION

Postage meters find extensive use throughout the world for imprinting postage on objects to be mailed. Postage, of course, is the amount of money or fee required to have the Post Office deliver a mail piece to which the postage is applied to an indicated address. The postage may be applied to a mail piece by a print head enclosed within the postage meter, i.e., directly upon an envelope or upon a label. When postage is printed upon a label, the label is then placed in adhering contact onto an envelope, parcel or other object to be mailed. The postage meter is also capable of printing information in addition to the amount of postage. For example, the postage meter is used for imprinting the date of mailing, the piece number, suitable indicia designating instructions and/or routing information for transport by private carriers, and the like as is well known. Furthermore, if desired, the postage meter can be utilized for the imprinting of yet other forms of labels, such as tax stamps, assuming that govermental approval for such tax stamps is obtained.

A potential problem in the use of imprinted postage is the attempt at fraudulent adulteration of such postage; whereby, in effect, the person adulterating the postage is stealing the value of the postage. A fraudulent impression may enable someone to obtain postage, or in the case of a tax stamp, to avoid paying the tax. The foregoing problems have been overcome by various methods of determining if the postage on a mail piece is genuine through various forms of encryption and apparatus have been designed to implement such methods.

SUMMARY OF THE INVENTION

The instant invention provides an advantageous method and apparatus for determining if the postage on a mail piece is genuine. The apparatus includes electronic circuitry for the development of an encrypted number, and a printer which is driven by the electronic circuitry to imprint indicia with both the postage and other information in combination with an encrypted number. An important feature of the invention is that the encryption is derived from data on the mail piece such as the amount of postage, the data, and, if desired, the sender and other data; thereby, the data imprinted on the mail piece or label is related to the encrypted number. In the event that the printed matter is altered, either the encrypted number cannot be decoded or, if decoded, the postage will not agree with the encrypted mark imprinted on the mail piece.

DETAILED DESCRIPTION OF THE PREFERRED EMBODIMENT

Figure 1:
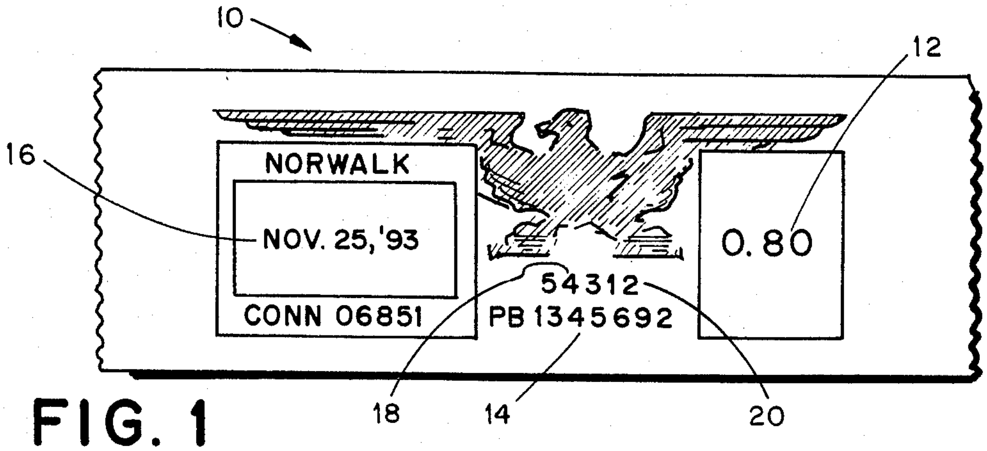
FIG. 1 shows typical indicia imprinted by a postage meter upon a label.

Referring now to FIG. 1, standard indicia that is imprinted by a postage meter on a mail piece is shown generally at 10. The indicia includes the amount of postage 12, a meter number 14 that identifies the postage meter that printed the indicia, the data 16 the postage is printed, the piece count 18, that indicates the number of times the postage meter has printed postage, and a code or encrypted number 20. In this embodiment, the encrypted number 20 is placed as if it were the least significant number of the piece count 18. The use of piece counts, and piece count registers is disclosed, for example, in U.S. Pat. No. 3,978,457, assigned to the Assignee of the present application. It will be appreciated that the encrypted number may be alphanumeric, and that the encrypted number may be placed anywhere whether in the form of numerics, alphanumerics or any similar type of mark.

Figure 3:
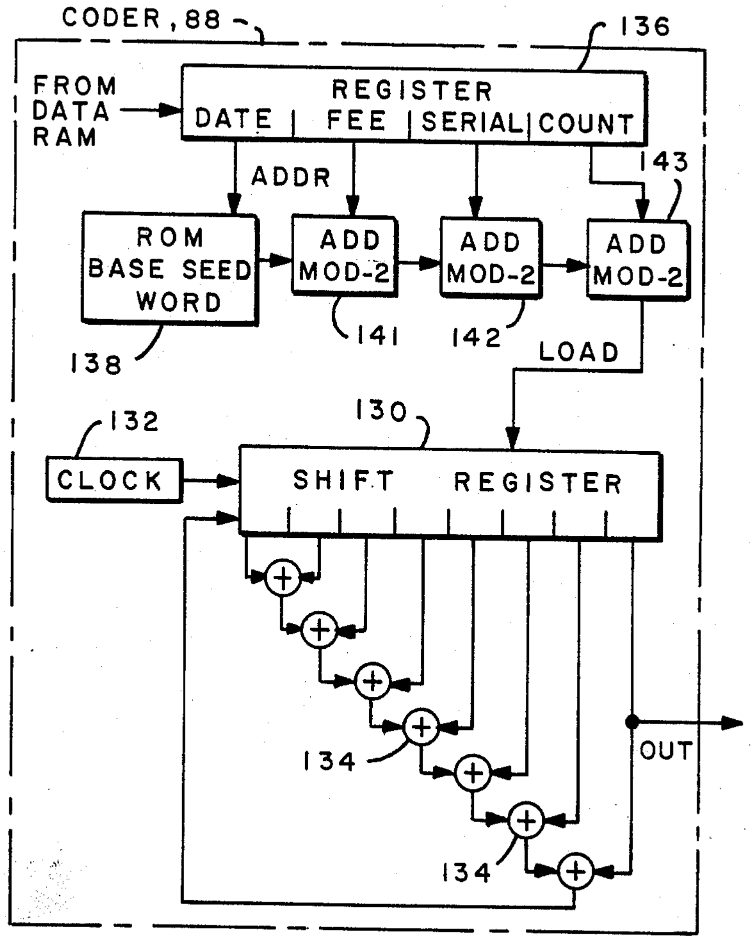
FIG. 3 is a block diagram of a known coder system.

Coders for obtaining an encrypted number 20 are well known and may use a variety of systems such as that used by the National Bureau of Standards based on the multiplication of pairs of large numbers. A coder that may be utilized in the instant invention for obtaining a seed number and a resulting encrypted number is described in corresponding U.S. patent application, Ser. No. 515,760, filed July 21, 1983 and which is assigned to the assignee of this application incorporated herein by reference. FIG. 3 of this application corresponds to FIG. 5 of application Ser. No. 515,760, wherein it is stated with reference to this figure that therein is shown a simplified representation of a coder 88. Coding devices are readily available commercially and by way of example, a maximal-length shift-register code generator is described in present FIG. 3. The coder 88 comprises a shift register 130, which stores a seed word, and is driven by a clock 132. A set of modulo-2 adders 134 sum the contents of successive ones of the cells of the shift register, with the resultant sum being inputted to the first cell of the register 130. The contents of the right-hand cell of the shift register 130 is designated as the output terminal of the coder 88.

In accordance with a feature of the invention, the seed word is generated by use of input data relating to one or more parameters such as the data, the fee, the serial number of the sending station 24, and the count of mailpieces and other packages provided by the counter 43. Accordingly, the coder 88 further comprises a register 136 and three adders 141–143. The ROM 138 stores a set of seed words which are addressed in accordance with the three last significant bits of the data, there being accordingly eight base seed words stored in the ROM 138. The selected base seed word is then added modulo-2 with the fee at the adder 141 and again added modulo-2 with the serial number of the sending station 24 at the adder 142, and again added modulo-2 with the piece count of the counter 43. The serial number is being permanently stored in the register 136. The output digital word of the adder 143 is then loaded into the shift register 130 to serve as the seed word from which the code is generated by the coder 38.

It is to be understood that the foregoing contributions to the seed word are presented by way of example. Thus, if desired, the contribution of the serial number and/or the fee may be deleted. The use of the data and the piece count in the composition of the seed word is advantageous in providing a seed word which varies from mailpiece to mailpiece and from day to day, a clear benefit for improved security. In the event that a microprocessor (not shown) be incorporated in the sending station 24 and the receiving station 28, other forms of codes can be generated such as those of the National Bureau of Standards based on the multiplication of pairs of large numbers. Imprinting coding and decoding arrangements are also disclosed in U.S. Pat. No. 3,990,558. Seed number generation is also disclosed in U.S. Pat. No. 4,376,299, Rivest, also assigned to the Assignee of the present application.

Figure 2:
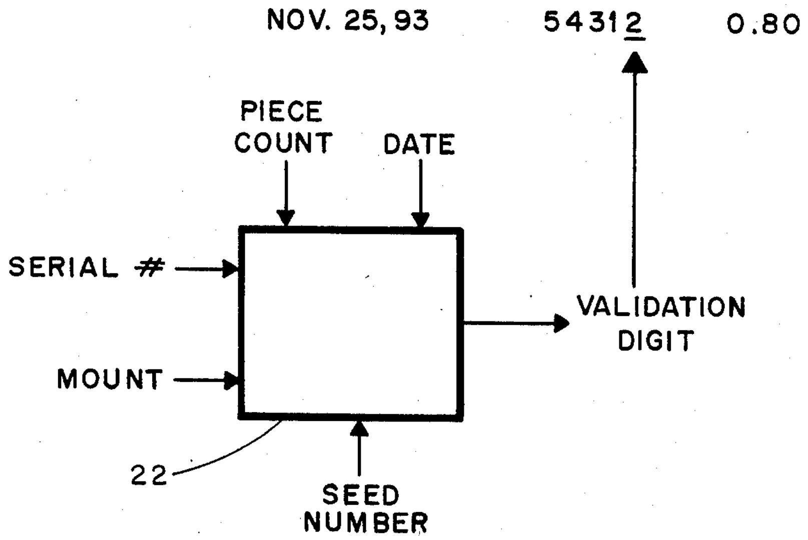
FIG. 2 is a block diagram describing the features of the invention.

In FIG. 2, a system is shown that may be utilized to validate the information shown in FIG. 1., and includes a decoder 22. This decoder may be a microprocessor such as an Intel model 8039. When there is a question as to the validity of the postage on a mail piece, a postal official, or clerk, would input into the decoder 22 the postage amount 12, the serial number 14, the date 16, the piece count 18 in any convenient manner. The decoder 22 would have resident therein the seed number generated by a coder. The decoder is utilized for decoding and performs an encryption algorithm for determining the valid encryption mark based upon information supplied to the decoder. After processing the input information, the valid mark would be supplied to the postal official, as for example, on a display. If the mark generated by the decoder 22 coresponds to the number following the piece count, than the operator knows the postage is genuine. If there is no such match, then the postal official is aware of wrongdoing and can take appropriate action.

As stated previously, the encrypted mark 20 may be placed at any appropriate part of the indicia in any convenient form. For example, the encrypted mark 20 could be a part of the postage meter number or it could stand alone. In any event, as long as a standard system is established in accordance with the teachings herein, the authenticity of postage may be verified.

What is claimed is:

1. A method of verifying postage through an encrypted mark that is part of alphanumeric indicia applied to a mail piece, comprising:

storing a seed number, inputting postal data to be imprinted on the mail piece, deriving a single encrypted alphanumeric character based upon the stored seed number and input postal data, and imprinting said mail piece with indicia including a string of alphanumeric characters representing at least a portion of said data and including said single encrypted alphanumeric character as the only encryption of said indicia.

2. The method of claim 1 including the step of providing the postage fee, the meter serial number, the piece count and the date as part of the input data.

3. The method of claim 1, wherein said string of characters consists of a piece count terminated by said alphanumeric character.

4. In the method for the validation of postage by applying an encrypted mark as a part of indicia applied to a mail piece, and applying the indicia to the mail piece, the indicia including said encryption mark and alphanumeric data;

the improvement comprising deriving a single digit encrypted number from said data, combining said encrypted number as the terminal part and only encrypted part of said data; and imprinting said combined data and encrypted number on said mail piece.

5. The method of claim 4 wherein said alphanumeric data comprises a piece count indicating the number of times a postage meter for imprinting the indicia has printed postage, said step of combining comprising combining said encrypted number as the terminal part of said piece count.

6. The method of claim 4 wherein said alphanumeric data applied to said mail piece includes a postage amount and a date, and said method of deriving an encrypted number comprises deriving a single digit encrypted number that depends in a predetermined manner on said postage amount and date.

7. The method of claim 4 wherein said step of imprinting comprises printing said single digit as the terminal part of an uncoded series of alphanumeric characters relating to postal information.

8. An apparatus for verifying postage through an encyrpted mark that is part of alphanumeric indicia applied to a mail piece, comprising:

means for storing a seed number, means for inputting postal data to be imprinted on the mail piece, means for deriving an encrypted alphanumeric character based upon the stored seed number and input postal data, and means for imprinting said mail piece with indicia including a string of alphanumeric characters representing at least a portion of said data and including said encrypted alphanumeric character as the sole encryption of the indicia.

9. In an apparatus for the validation of postage by applying an encrypted mark as a part of indicia applied to a mail piece, the indicia applied to the mail piece including said encryption mark and alphanumeric data; the improvement comprising means for deriving a single digit encrypted number from said data, means for combining said encrypted number as a part of and the only encrypted part of said data; and means for imprinting said combined encrypted number and data on said mail piece.

10. The apparatus of claim 9 wherein said alphanumeric data comprises a piece count indicating the number of times a postage meter for imprinting the indicia has printed postage, said means for combining comprising means for combining said encrypted number as the terminal part of said piece count.

11. In a document having postal information including data representing a determined value, said document including a substrate, said postal information imprinted on said substrate, said postal information including a plurality of alphanumeric characters; the improvement wherein said postal information includes a string of alphanumeric characters, only one of said string of alphanumeric characters being an encrypted character, said character having an identity related to said postal information in accordance with a determined algorithm, said postal information data being representative of a determined value relating to said document.

12. The document of claim 11 wherein said alphanumeric character is the terminal character of said string.

* * * * *